United States Patent
Kang et al.

(10) Patent No.: US 12,424,704 B2
(45) Date of Patent: Sep. 23, 2025

(54) BINDER AND SEPARATOR CONTAINING SAME

(71) Applicant: CONTEMPORARY AMPEREX TECHNOLOGY (HONG KONG) LIMITED, Hong Kong (CN)

(72) Inventors: Haiyang Kang, Ningde (CN); Lei Li, Ningde (CN); Yi Zheng, Ningde (CN); Chengdong Sun, Ningde (CN); Shaohua Ai, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 92 days.

(21) Appl. No.: 18/502,978

(22) Filed: Nov. 6, 2023

(65) Prior Publication Data
US 2024/0120615 A1   Apr. 11, 2024

Related U.S. Application Data

(63) Continuation of application No. PCT/CN2022/121652, filed on Sep. 27, 2022.

(51) Int. Cl.
*H01M 50/446* (2021.01)
*C08F 220/14* (2006.01)
(Continued)

(52) U.S. Cl.
CPC ......... *H01M 50/446* (2021.01); *C08F 220/14* (2013.01); *C08F 220/1802* (2020.02);
(Continued)

(58) Field of Classification Search
CPC .... C08F 220/42; C08F 220/44; C08F 220/43; C08F 220/54; C08F 220/56; C08F 220/14;
(Continued)

(56) References Cited

U.S. PATENT DOCUMENTS

2024/0097276 A1* 3/2024 Li .................. C08F 220/20
2024/0360259 A1* 10/2024 Li .................. H01M 50/434

FOREIGN PATENT DOCUMENTS

CN    102334215 A  *  1/2012  .......... H01M 10/052
CN    102971895 A     3/2013
(Continued)

OTHER PUBLICATIONS

Machine translation of CN 109841779 (no date) (Year: 0000).*
(Continued)

*Primary Examiner* — Amanda C. Walke
(74) *Attorney, Agent, or Firm* — ANOVA LAW GROUP, PLLC

(57) ABSTRACT

A binder includes a polymer and ceramic particles modified with silane coupling agent. The polymer contains structural units derived from a first-type monomer, a second-type monomer, and a third-type monomer, and a molar ratio of the first-type monomer, the second-type monomer, and the third-type monomer is (50 to 58):(40 to 44):(2 to 6). The first-type monomer is selected from one or more compounds of formula I, the second-type monomer is selected from one or more compounds of formula II, and the third-type monomer is selected from one or more compounds of formula III.

I

II (Continued)

-continued

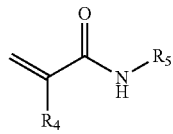

III

20 Claims, 3 Drawing Sheets

(51) Int. Cl.
| | |
|---|---|
| *C08F 220/18* | (2006.01) |
| *C08F 220/28* | (2006.01) |
| *C08K 9/06* | (2006.01) |
| *H01M 50/42* | (2021.01) |
| *H01M 50/423* | (2021.01) |
| *H01M 50/434* | (2021.01) |
| *H01M 50/443* | (2021.01) |
| *H01M 50/451* | (2021.01) |

(52) U.S. Cl.
CPC .. *C08F 220/1804* (2020.02); *C08F 220/1806* (2020.02); *C08F 220/1811* (2020.02); *C08F 220/281* (2020.02); *C08K 9/06* (2013.01); *H01M 50/42* (2021.01); *H01M 50/423* (2021.01); *H01M 50/434* (2021.01); *H01M 50/443* (2021.01); *H01M 50/451* (2021.01); *C08F 2800/10* (2013.01)

(58) Field of Classification Search
CPC .......... C08F 220/1802; C08F 220/1803; C08F 220/1804; C08F 220/1805; C08F 220/1806; C08F 220/1807; C08F 220/1808; C08F 220/1809; C08F 220/1811; C08F 220/1812; C08F 220/1818; C08F 2800/10
See application file for complete search history.

(56) References Cited

FOREIGN PATENT DOCUMENTS

| | | |
|---|---|---|
| CN | 106220779 A | 12/2016 |
| CN | 106328869 A | 1/2017 |
| CN | 109841779 A | 6/2019 |
| CN | 112259913 A | 1/2021 |
| CN | 113166518 A | 7/2021 |
| CN | 113851787 A | 12/2021 |
| CN | 114573751 A | 6/2022 |
| JP | 2015185530 A | 10/2015 |
| JP | 2019526693 A | 9/2019 |
| KR | 20190133412 A | 12/2019 |
| WO | WO-2021251092 A1 * | 12/2021 |

OTHER PUBLICATIONS

Machine translation of CN 102334215 (no date) (Year: 0000).*
The World Intellectual Property Organization (WIPO) International Search Report and Written Opinion for PCT/CN2022/121652 Jun. 5, 2023 15 pages (Including English translation).
The Japan Patent Office (JPO) Decision to Grant a Patent for Application No. 2023-569613 Jan. 30, 2025 5 Pages (including translation).

* cited by examiner

BINDER AND SEPARATOR CONTAINING SAME

CROSS-REFERENCE TO RELATED APPLICATION

This application is a continuation of International Application No. PCT/CN2022/121652, filed on Sep. 27, 2022, the entire content of which is incorporated herein by reference.

TECHNICAL FIELD

This application relates to the field of lithium battery technologies, and in particular, to a binder and a separator containing the same. This application further relates to a secondary, a battery module, a battery pack, and an electric apparatus.

BACKGROUND

In recent years, with increasingly wide use of secondary batteries, the secondary batteries have been widely used in energy storage power supply systems such as hydroelectric, thermal, wind, and solar power plants, and many other fields including electric tools, electric bicycles, electric motorcycles, electric vehicles, military equipment, and aerospace. Along with the great development of secondary batteries, higher requirements are imposed on their cycling performance, safety performance, and the like. However, the binder in the related art has inadequate adhesion force, leading to problems such as powder falling of the separator and poor adhesion with the electrode plate, thereby limiting development of the secondary battery performance. Therefore, this field requires a binder and separator with a better adhesion effect.

SUMMARY

This application is made in view of the preceding subject matter and aims to provide a binder, a separator containing the same, a secondary battery, a battery module, a battery pack, and an electric device. The binder in the present disclosure can improve an adhesion effect between ceramic particles and a separator substrate and between the separator and the electrode plate and can improve the cycling performance of the secondary battery.

To achieve the above purpose, this application provides a binder, a separator containing the composition, a secondary battery, a battery pack, and an electric apparatus.

A first aspect of this application provides a binder including a polymer and ceramic particles modified with silane coupling agent; the polymer containing structural units derived from a first-type monomer, a second-type monomer, and a third-type monomer, and a molar ratio of the first-type monomer, second-type monomer, and third-type monomer being (50 to 58):(40 to 44):(2 to 6); where the first-type monomer is selected from one or more compounds of formula I:

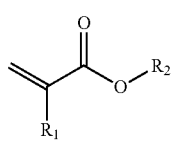

I where $R_1$ is selected from a hydrogen atom and a straight-chain or branched-chain $C_{1-6}$ alkyl group, and $R_2$ is selected from a substituted or unsubstituted straight-chain or branched-chain $C_{1-15}$ alkyl group, a $C_{3-6}$ cycloalkyl group, and an isobornyl group, where in a case of substitution, a substituent group is selected from a hydroxyl group and a $C_{1-6}$ chain alkyl group;

the second-type monomer is selected from one or more compounds of formula II:

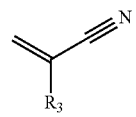

II where $R_3$ is selected from a hydrogen atom and a straight-chain or branched-chain $C_{1-6}$ alkyl group; and the third-type monomer is selected from one or more compounds of formula III:

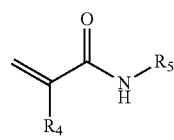

III where $R_4$ is selected from a hydrogen atom and a straight-chain or branched-chain $C_{1-6}$ alkyl group, and $R_5$ is selected from a hydrogen atom, a hydroxy $C_{1-6}$ alkyl group, and a $C_{1-6}$ alkoxy group. The binder in this application has a high adhesion force, reducing or even preventing the occurrence of "powder falling", thereby improving the cycling performance of the secondary battery.

In any embodiment, $R_1$ is selected from a hydrogen atom and a methyl group, and $R_2$ is selected from a substituted or unsubstituted straight-chain or branched-chain $C_{1-6}$ alkyl group, where in a case of substitution, a substituent group is a hydroxyl group; and/or $R_3$ is selected from a hydrogen atom and a methyl group; and/or $R_4$ is selected from a hydrogen atom and a methyl group, and $R_5$ is selected from a hydrogen atom, a hydroxy $C_{1-4}$ alkyl group, and a $C_{1-4}$ alkoxy group.

In any embodiment, the first-type monomer is selected from one or more of methyl acrylate, ethyl acrylate, n-butyl acrylate, isobutyl acrylate, sec-butyl acrylate, tert-butyl acrylate, n-propyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate, 2-ethyl hexyl methacrylate, isobornyl methacrylate, lauryl methacrylate, 2-hydroxy ethyl methacrylate, and 2-hydroxypropyl methacrylate; and/or the second-type monomer is acrylonitrile or methacrylonitrile; and/or the third-type monomer is selected from one or more of acrylamide, N-methylolacrylamide, and N-butoxymethacrylamide. Further selecting the first, second, and third-type monomers can more effectively improve the adhesion effect of the binder and increase cycling capacity retention rate of the battery.

In any embodiment, a molar ratio of the second-type monomer, and the third-type monomer is (50 to 57):(41 to 44):(2 to 6). The molar ratio in such range can further improve the adhesion performance of the binder and increase the cycling capacity retention rate of the battery.

In any embodiment, the polymer has a weight-average molecular weight of 60,000 to 120,000, optionally 63,300 to 118,800. The weight-average molecular weight of the polymer is within the foregoing range, so that the polymer can have proper fluidity in binder application, thus improving the adhesion effect.

In any embodiment, the ceramic particles modified with silane coupling agent have a median particle size $D_v50$ of 200 nm to 980 nm, optionally 200 nm to 600 nm, and more optionally 330 nm to 550 nm. Controlling the particle size of the ceramic particles within the foregoing range facilitates uniform distribution and their adhesion to the separator substrate. In addition, it is not easy to clog pores of the separator.

In any embodiment, the silane coupling agent is selected from one or more of the compounds of formula IV:

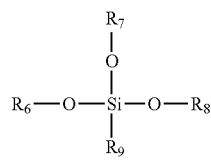

IV where $R_6$, $R_7$, and $R_8$ are independently selected from a straight-chain or branched-chain $C_{1-6}$ alkyl group; $R_9$ is selected from a $C_{2-6}$ alkenyl group and a $C_{1-6}$ straight alkyl group, where at least one hydrogen atom on a carbon atom on an end of the $C_{1-6}$ straight alkyl group is substituted with a substituent group selected from amino, 2,3-epoxypropyl oxy, and methacryloyloxy; optionally, $R_6$, $R_7$, and $R_8$ are independently selected from methyl and ethyl, and/or $R_9$ is selected from vinyl, 3-aminopropyl, 3-(2,3-epoxypropoxy)propyl, and 3-(methacryloyloxy)propyl; and more optionally, the silane coupling agent is selected from one or more of vinyltriethoxysilane, 3-aminopropyltriethoxysilane, 3-(2,3-epoxypropoxy)propyltrimethoxysilane, and 3-(methacryloyloxy)propyltrimethoxysilane. Selecting the foregoing ceramic particles modified with silane coupling agent can improve the adhesion effect while improving the capacity retention rate.

In any embodiment, a weight ratio of the ceramic particles and the silane coupling agent is (97.5 to 99.9):(0.1 to 2.5), optionally (98.0 to 99.9):(0.1 to 2.0), more optionally (98.2 to 99.4):(0.6 to 1.8). The weight ratio of the ceramic particles and the silane coupling agent being in the foregoing range can facilitate improving the adhesion force and cycling performance.

In any embodiment, a weight ratio of the polymer and the ceramic particles is (40 to 90):(10 to 60), optionally (50 to 80):(20 to 50). A weight ratio of the polymer and the ceramic particles being within the foregoing range reduces "powder falling" and facilitates improving the battery cycling performance.

In any embodiment, the polymer is applied to the ceramic particles. This can reduce or prevent clogging and facilitates improving heat resistance and adhesion effect.

A second aspect of this application provides a separator, where the separator includes a substrate and a coating provided on at least one surface of the base layer, the coating including the binder according to the first aspect of this application. The separator in this application is chemically and mechanically stable and is well adhered to the positive electrode plate, which is conducive to improving the cycling performance of the battery.

A third aspect of this application provides a secondary battery including the binder according to the first aspect of this application or the separator according to the second aspect of this application.

A fourth aspect of this application provides a battery module including the secondary battery according to the third aspect of this application.

A fifth aspect of this application provides a battery pack, including the battery module according to the fourth aspect of this application.

A sixth aspect of this application provides an electric apparatus, including at least one of the secondary battery according to the third aspect of this application, the battery module according to the fourth aspect of this application, or the battery pack according to the fifth aspect of this application.

The binder in this application has good adhesion performance, thereby enhancing the cycling performance of the secondary battery.

Figure 1:
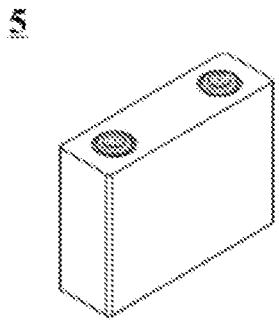
FIG. 1 is a schematic diagram of a secondary battery according to an embodiment of this application.

Reference signs are described as follows:
1. battery pack; 2. upper box body; 3. lower box body; 4. battery module; 5. secondary battery; 51. housing; 52. electrode assembly; and 53. top cover assembly.

DESCRIPTION OF EMBODIMENTS

The following specifically discloses in detail embodiments of a binder, a separator, a secondary battery, a battery module, a battery pack, and an electric apparatus of this application with appropriate reference to the accompanying drawings. However, there may be cases where unnecessary detailed descriptions are omitted. For example, detailed descriptions of well-known matters and repeated descriptions of actually identical structures have been omitted. This is to avoid unnecessarily prolonging the following description, for ease of understanding by persons skilled in the art. In addition, the accompanying drawings and the following descriptions are provided for persons skilled in the art to fully understand this application and are not intended to limit the subject matter recorded in the claims.

"Ranges" disclosed in this application are defined in the form of lower and upper limits. A given range is defined by one lower limit and one upper limit selected, where the selected lower and upper limits define boundaries of that particular range. Ranges defined in this method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if minimum values of a range are given as 1 and 2, and maximum values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be combined with each other to form new technical solutions.

Unless otherwise specified, all the technical features and optional technical features of this application can be combined with each other to form new technical solutions.

Unless otherwise specified, all the steps in this application can be performed in the order described or in random order, in some embodiments, in the order described. For example, a method including steps (a) and (b) indicates that the method may include steps (a) and (b) performed in order or may include steps (b) and (a) performed in order. For example, the foregoing method may further include step (c), which indicates that step (c) may be added to the method in any ordinal position, for example, the method may include steps (a), (b), and (c), steps (a), (c), and (b), steps (c), (a), and (b), or the like.

Unless otherwise specified, "include" and "contain" mentioned in this application are non-exclusive. For example, the terms "include" and "contain" can mean that other unlisted components may or may not also be included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present). In this disclosure, the phrases "at least one of A, B, and C" and "at least one of A, B, or C" both mean only A, only B, only C, or any combination of A, B, and C.

In recent years, with increasingly wide use of secondary batteries, the secondary batteries have been widely used in energy storage power supply systems such as hydroelectric, thermal, wind, and solar power plants, and many other fields including electric tools, electric bicycles, electric motorcycles, electric vehicles, military equipment, and aerospace. Along with the great development of secondary batteries, higher requirements are imposed on their energy density, cycling performance, safety performance, and the like. The separator, one of the important components of the secondary battery, is also a focus of research and improvement in this field. To improve the thermal performance of the separator, a coating including ceramic particles (for example, oxide inorganic particles such as silica particles) and a polymer binder is commonly applied to the separator substrate surface to inhibit thermal contraction of the separator when exposed to a high temperature environment. However, existing polymer binders suffer from various problems: poor compatibility with ceramic particles, a tendency to "power falling", inability to maintain long-term effective adhesion between the coating and the substrate, as well as weak adhesion between the separator and the electrode plate, thus affecting the cycling performance of the secondary battery.

Therefore, there is a need in this field for a binder that can alleviate the foregoing problems. In view of this, this application provides a binder including a polymer that has an adhesion effect and ceramic particles modified with silane coupling agent to improve safety, implement good adhesion effect, and improve capacity retention.

Binder

In an embodiment of this application, this application provides a binder including a polymer and ceramic particles modified with silane coupling agent, the polymer containing structural units derived from a first-type monomer, a second-type monomer, and a third-type monomer, and a molar ratio of the first-type monomer, the second-type monomer, and the third-type monomer being (50 to 58):(40 to 44):(2 to 6), where the first-type monomer is selected from one or more compounds of formula I:

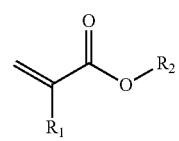

I where $R_1$ is selected from a hydrogen atom and a straight-chain or branched-chain $C_{1-6}$ alkyl group, and $R_2$ is selected from a substituted or unsubstituted straight-chain or branched-chain $C_{1-15}$ alkyl group, a $C_{3-6}$ cycloalkyl group, and an isobornyl group, where in a case of substitution, a substituent group is selected from a hydroxyl group and a $C_{1-6}$ chain alkyl group;

the second-type monomer is selected from one or more compounds of formula II:

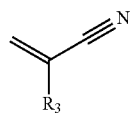

II where $R_3$ is selected from a hydrogen atom and a straight-chain or branched-chain $C_{1-6}$ alkyl group; and the third-type monomer is selected from one or more compounds of formula III:

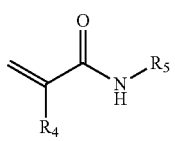

III where $R_4$ is selected from a hydrogen atom and a straight-chain or branched-chain $C_{1-6}$ alkyl group, and $R_5$ is selected from a hydrogen atom, a hydroxy $C_{1-6}$ alkyl group, and a $C_{1-6}$ alkoxy group.

The binder in this application has a high adhesion force, reducing or even preventing the occurrence of "powder falling" from ceramic particles while improving the adhesion effect between the separator and the electrode plate (especially the positive electrode plate), thereby improving the cycling performance of the secondary battery.

The first-type monomer is an acrylate monomer, which can increase polymer swelling resistance. As a flexible monomer chain segment in the molecular chain segment, it can regulate glass transition temperature of the polymer, improve the fluidity of the binder in the application, and contribute to achieving a good adhesion effect. The second-type monomer is an acrylonitrile monomer, which contains cyano groups that exhibit strong polarity. These groups help to increase ionic conductivity and improve the cycling performance. The third-type monomer is an acrylamide monomer, which can regulate the molecular weight. The molar ratio of the foregoing three monomers being controlled within the foregoing range can control molecular weight of the polymer and the glass transition temperature, thus improving the adhesion performance of the binder.

The silane coupling agent is firmly connected to the ceramic particles, thus improving the compatibility (such as good dispersion) of inorganic particles in an organic environment. It also cross-links with the polymer and the separator base material, improving the adhesion effect of the binder to the separator and the electrode plate.

In this specification, "ceramic particles modified with silane coupling agent" can also be referred to as the coating treatment or surface modification treatment of ceramic particles with the silane coupling agent, meaning that covalent or hydrogen bonds are formed between the hydroxyl groups generated by the hydrolysis of the coupling agent and the active groups on the surface of the ceramic particles, so that the coupling agent molecules are bonded to the ceramic particles.

In some embodiments, $R_1$ is selected from a hydrogen atom and a methyl group, and $R_2$ is selected from a substituted or unsubstituted straight-chain or branched-chain $C_{1-6}$ alkyl group, where in a case of substitution, a substituent group is a hydroxyl group; and/or $R_3$ is selected from a hydrogen atom and a methyl group; and/or $R_4$ is selected from a hydrogen atom and a methyl group, and $R_5$ is selected from a hydrogen atom, a hydroxy $C_{1-4}$ alkyl group, and a $C_{1-4}$ alkoxy group.

In some embodiments, the first-type monomer is selected from one or more of methyl acrylate, ethyl acrylate, n-butyl acrylate, isobutyl acrylate, sec-butyl acrylate, tert-butyl acrylate, n-propyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate, 2-ethyl hexyl methacrylate, isobornyl methacrylate, lauryl methacrylate, 2-hydroxy ethyl methacrylate, and 2-hydroxypropyl methacrylate. In some embodiments, the second-type monomer is acrylonitrile or methacrylonitrile. In some embodiments, the third-type monomer is selected from one or more of acrylamide, N-methylolacrylamide, and N-butoxymethacrylamide.

Further selecting the first, second, and third-type monomers can more effectively improve the adhesion effect of the binder and increase cycling capacity retention rate of the battery.

In some embodiments, a molar ratio of the second-type monomer, and the third-type monomer is (50 to 57):(41 to 44):(2 to 6). The molar ratio in such range can further improve the adhesion performance of the binder and increase the cycling capacity retention rate of the battery.

In some embodiments, based on a total molar mass of the first-type monomer, second-type monomer, and third-type monomer, a molar percentage of the first-type monomer is 50 mol % to 58 mol %, optionally 50 mol % to 57 mol %; optionally, a molar percentage of the first-type monomer is 50 mol %, 51 mol %, 52 mol %, 53 mol %, 54 mol % 55 mol %, 56 mol %, 57 mol %, or 58 mol %, or in a range defined by any two of these numbers. In some embodiments, based on a total molar mass of the first-type monomer, second-type monomer, and third-type monomer, a molar percentage of the second-type monomer is 40 mol % to 44 mol %, optionally 41 mol % to 44 mol %; optionally, a molar percentage of the second-type monomer is 40 mol %, 41 mol %, 42 mol %, 43 mol %, or 44 mol %, or in a range defined by any two of these numbers. In some embodiments, based on a total molar mass of the first-type monomer, second-type monomer, and third-type monomer, a molar percentage of the third-type monomer is 2 mol % to 6 mol %; optionally, a molar percentage of the third-type monomer is 2 mol %, 3 mol %, 4 mol %, 5 mol %, or 6 mol %, or in a range defined by any two of these numbers.

In some embodiments, the polymer has a weight-average molecular weight of 60,000 to 120,000, optionally 63,300 to 118,800. The weight-average molecular weight of the polymer is within the foregoing range, so that the polymer can have proper fluidity in binder application, thus improving the adhesion effect.

In some embodiments, the ceramic particles may be selected from conventional materials in the art. In some embodiments, the ceramic particles are selected from aluminum oxide, boehmite, titanium dioxide, and silicon dioxide. Selection of these materials can improve heat resistance of the separator and improve safety.

In some embodiments, the ceramic particles modified with the silane coupling agent have a median particle size $D_v50$ of 200 nm to 980 nm; optionally, the median particle size $D_v50$ is 330 nm, 460 nm, 550 nm, 590 nm, 780 nm, or 980 nm, or in a range defined by any two of these numbers. Optionally, the median particle size $D_v50$ is 200 nm to 600 nm, more optionally 330 nm to 590 nm, and more optionally 330 nm to 550 nm. Controlling the particle size of the ceramic particles within the foregoing range facilitates uniform distribution of ceramic particles and their adhesion to the separator substrate. In addition, it is not easy to clog pores of the separator, resulting in a high adhesion force and good capacity retention rate.

In some embodiments, the silane coupling agent is selected from one or more of the compounds of formula IV:

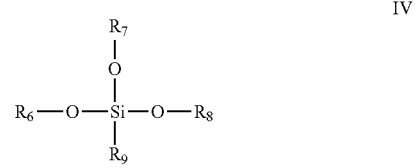

where $R_6$, $R_7$, and $R_8$ are independently selected from a straight-chain or branched-chain $C_{1-6}$ alkyl group; $R_9$ is selected from a $C_{2-6}$ alkenyl group and a $C_{1-6}$ straight alkyl group, where at least one hydrogen atom on a carbon atom on an end of the $C_{1-6}$ straight alkyl group is substituted with a substituent group selected from amino, 2,3-epoxypropyl oxy, and methacryloyloxy. In some embodiments, the $C_{2-6}$ alkenyl is an end alkenyl group. In some embodiments, $R_6$, $R_7$, and $R_8$ are independently selected from a straight-chain or branched-chain $C_{1-4}$ alkyl group; optionally, $R_6$, $R_7$, and $R_8$ are independently selected from a methyl group, an ethyl group, an n-propyl group, and an isopropyl group; more optionally, $R_6$, $R_7$, and $R_8$ are independently selected from a methyl group and an ethyl group. In some embodiments, $R_9$ is selected from a $C_{2-4}$ alkenyl group and a $C_{1-4}$ straight-chain alkyl group, optionally a $C_{2-4}$ end alkenyl group and a $C_{1-4}$ straight alkyl group, and one hydrogen atom on the end carbon atom of the $C_{1-4}$ straight alkyl group is substituted with a substituent group selected from amino, 2,3-epoxypropoxy, and methacryloyloxy. In some embodiments, $R_6$, $R_7$, and $R_8$ are independently selected from methyl and ethyl, and $R_9$ is selected from vinyl, 3-aminopropyl, 3-(2,3-epoxypropoxy)propyl, and 3-(methacryloyloxy)propyl. The silane coupling agent is selected to modify the ceramic particles (or referred to as the coating treatment or surface modification of ceramic particles), and hydroxyl groups generated by the hydrolysis of the coupling agent interact with the active groups on the surface of the ceramic particles to form covalent or hydrogen bonds. In addition, the active groups carried by the silane coupling agent itself can react with the polymer and the separator substrate, acting as a "bridge", improving both the adhesion effect and the capacity retention rate.

In some embodiments, $R_6$, $R_7$, and $R_8$ are independently selected from methyl and ethyl, and $R_9$ is selected from vinyl, 3-aminopropyl, 3-(2,3-epoxypropoxy)propyl, and 3-(methacryloyloxy)propyl. In some embodiments, particularly, the silane coupling agent is selected from one or more of vinyltriethoxysilane, 3-aminopropyltriethoxysilane, 3-(2, 3-epoxypropoxy)propyltrimethoxysilane, and 3-(methacryloyloxy)propyltrimethoxysilane, thus acquiring good adhesion force and ideal capacity retention rate.

In some embodiments, a weight ratio of the ceramic particles and silane coupling agent is (97.5 to 99.9):(0.1 to 2.5), optionally (98.0 to 99.9):(0.1 to 2.0), more optionally (98.2 to 99.4):(0.6 to 1.8). A weight ratio of ceramic particles to silane coupling agent is within the foregoing range, allowing the surface of ceramic particles to be quickly and effectively coated with the silane coupling agent, thus resulting in improved dispersion without causing cross-linking and flocculation of the coupling agent itself. This facilitates the improvement of the adhesion force and cycling performance.

In some embodiments, a weight ratio of the polymer and the ceramic particles is (40 to 90):(10 to 60), optionally (50 to 80):(20 to 50). The weight ratio of polymer to ceramic particles is in the foregoing range, reducing the occurrence of "powder falling" and allowing the separator to have good heat resistance and good ability to electrolyte infiltration, absorption, and retainment, thereby improving the battery cycling performance.

In some embodiments, the polymer is applied to the ceramic particles. Before application, the polymer is applied to the ceramic particles to reduce or prevent particle ingress into the pores of the separator to cause clogging, and also to ensure that the binder and ceramic particles can be uniformly applied to the substrate in a desirable ratio to achieve improved heat resistance and good adhesion.

Separator

Another aspect of this application provides a separator, where the separator includes a substrate and a coating provided on at least one surface of the base layer, the coating including the binder in this application.

The separator base layer is not particularly limited to a specific type of material in this application and may be any well-known porous base layer with good chemical and mechanical stability.

In some embodiments, a material of the base layer of the separator may be selected from at least one of glass fibers, non-woven fabric, polyethylene, polypropylene, and polyvinylidene fluoride. The separator may be a single-layer film or a multi-layer composite film and is not particularly limited. When the separator is a multi-layer composite film, all layers may be made of same or different materials, which is not particularly limited.

Secondary Battery, Battery Module, Battery Pack, and Electric Apparatus

A third aspect of this application provides a secondary battery including the binder in this application, and/or the separator in this application.

A fourth aspect of this application provides a battery module including the foregoing secondary battery in the third aspect.

A fifth aspect of this application provides a battery pack including the foregoing battery module in the fourth aspect.

A sixth aspect of this application provides an electric apparatus including at least one of the foregoing secondary battery in the third aspect, the battery module in the fourth aspect, and the battery pack in the fifth aspect.

In addition, the following describes a secondary battery, a battery module, a battery pack, and an electric apparatus in this application with appropriate reference to the accompanying drawings.

An embodiment of this application provides a secondary battery. In some embodiments, the secondary battery is a lithium-ion secondary battery.

Normally, the secondary battery includes a positive electrode plate, a negative electrode plate, an electrolyte, and a separator. In a charge and discharge process of the battery, active ions are intercalated and deintercalated between the positive electrode plate and the negative electrode plate. The electrolyte conducts ions between the positive electrode plate and the negative electrode plate. The separator is disposed between the positive electrode plate and the negative electrode plate to mainly prevent a short circuit between positive and negative electrodes and to allow the ions to pass through.

[Positive Electrode Plate]

The positive electrode plate includes a positive electrode current collector and a positive electrode film layer disposed on at least one surface of the positive electrode current collector, where the positive electrode film layer includes the positive electrode active material according to the first aspect of this application.

For example, the positive electrode current collector includes two opposite surfaces in its thickness direction, and the positive electrode film layer is disposed on either or both of the two opposite surfaces of the positive electrode current collector.

In some embodiments, the positive electrode current collector may be a metal foil current collector or a composite current collector. For example, an aluminum foil may be used as the metal foil. The composite current collector may include a polymer material matrix and a metal layer formed on at least one surface of the polymer material matrix. The composite current collector may be formed by forming a metal material (aluminum, aluminum alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the positive electrode active material may be a well-known positive electrode active material used for a battery in the art. For example, the positive electrode active material may include at least one of the following materials: olivine-structured lithium-containing phosphate, lithium transition metal oxide, and respective modified compounds thereof, sodium transition metal oxide, a polyanionic compound, and a Prussian blue compound. However, this application is not limited to such materials, and may alternatively use other conventional well-known materials that can be used as positive electrode active materials for batteries. One type of these positive electrode active materials may be used alone, or two or more of them may be used in combination. Examples of the lithium transition metal oxide may include but are not limited to at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiN_{1/3}Co_{1/3}Mn_{1/3}O_2$ ($NCM_{333}$ for short), $LiNi_{0.5}Co_{0.2}Mn_{0.3}O_2$ ($NCM_{523}$ for short), $LiNi_{0.5}Co_{0.25}Mn_{0.25}O_2$ ($NCM_{211}$ for short), $LiNi_{0.6}Co_{0.2}Mn_{0.2}O_2$ ($NCM_{622}$ for short), and $LiNi_{0.8}Co_{0.1}Mn_{0.1}O_2$ ($NCM_{811}$ for short)), lithium nickel cobalt aluminum oxide (for example, $LiNi_{0.85}Co_{0.15}Al_{0.05}O_2$), and modified compounds thereof. Examples of the olivine-structured lithium-containing phosphate may include but are not limited to at least one of lithium iron phosphate (for example, $LiFePO_4$ (LFP for short)), a composite material of lithium iron phosphate and carbon, lithium manganese phosphate (for example, $LiMnPO_4$), composite materials of lithium manganese phosphate and carbon, lithium manganese iron phosphate, and composite materials of lithium manganese iron phosphate and carbon.

In some embodiments, a transition metal in the sodium transition metal oxide may be at least one of Mn, Fe, Ni, Co, Cr, Cu, Ti, Zn, V, Zr, and Ce. The sodium transition metal oxide is, for example, $Na_xM_yO_2$, where M is one or more of Ti, V, Mn, Co, Ni, Fe, Cr, and Cu, $0<x\leq1$, and $0.5<y\leq1.5$. In some embodiments, the positive electrode active material may be $Na_{0.88}CU_{0.24}Fe_{0.29}Mn_{0.47}O_2$.

In some embodiments, the polyanionic compound may be a type of compounds having sodium ions, transition metal ions, and tetrahedral-type $(YO_4)^{n-}$ anionic units. The transition metal may be at least one of Mn, Fe, Ni, Co, Cr, Cu, Ti, Zn, V, Zr, and Ce; Y may be at least one of P, S, and Si; and n indicates a valence state of $(YO_4)^{n-}$.

In some embodiments, the polyanionic compound may alternatively be a type of compounds having sodium ions, transition metal ions, tetrahedral-type $(YO_4)^{n-}$ anionic units, and halogen anions. The transition metal may be at least one of Mn, Fe, Ni, Co, Cr, Cu, Ti, Zn, V, Zr, and Ce; Y may be at least one of P, S, and Si, and n indicates the valence state of $(YO_4)^{n-}$; and the halogen may be at least one of F, Cl, and Br.

In some embodiments, the polyanionic compound may be a type of compounds having sodium ions, tetrahedral-type $(YO_4)^{n-}$ anionic units, polyhedral units $(ZO_y)^{m+}$, and selectable halogen anions. Y may be at least one of P, S, and Si, and n indicates a valence state of $(YO_4)^{n-}$; Z indicates a transition metal and may be at least one of Mn, Fe, Ni, Co, Cr, Cu, Ti, Zn, V, Zr, and Ce, and m indicates the valence state of $(ZO_y)^{m+}$; the halogen may be at least one of F, Cl, and Br.

In some embodiments, the polyanionic compound is, for example, at least one of $NaFePO_4$, $Na_3V_2(PO_4)_3$, $NaM'PO_4F$ (M' is one or more of V, Fe, Mn, and Ni), and $Na_3(VO_y)_2(PO_4)_2F_{3-2y}(0\leq y\leq1)$.

In some embodiments, the Prussian blue compound may be a type of compounds having sodium ions, transition metal ions, and cyanide ions ($CN^-$). The transition metal may be at least one of Mn, Fe, Ni, Co, Cr, Cu, Ti, Zn, V, Zr, and Ce. The Prussian blue compound is, for example, $Na_aMe_bMe'_c(CN)_6$, where Me and Me' are independently at least one of Ni, Cu, Fe, Mn, Co and Zn, $0<a\leq2$, $0<b<1$, and $0<c<1$.

In some embodiments, the positive electrode film layer further optionally includes a binder. For example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethyl ene-hexafluoropropylene copolymer, or fluorine-containing acrylic resin.

In some embodiments, the positive electrode film layer further optionally includes a conductive agent. For example, the conductive agent may include at least one of superconducting carbon, acetylene black, carbon black, Ketjen black, carbon dots, carbon nanotubes, graphene, and carbon nanofiber.

In some embodiments, the positive electrode plate may be prepared in the following manner: the foregoing constituents used for preparing the positive electrode plate, for example, the positive electrode active material, the conductive agent, the binder, and any other constituent, are dispersed in a solvent (for example, N-methylpyrrolidone) to form a positive electrode slurry; and the positive electrode slurry is applied onto the positive electrode current collector, followed by processes such as drying and cold pressing to obtain the positive electrode plate.

[Negative Electrode Plate]

The negative electrode plate includes a negative electrode current collector and a negative electrode film layer disposed on at least one surface of the negative electrode current collector, where the negative electrode film layer includes a negative electrode active material.

For example, the negative electrode current collector includes two opposite surfaces in its thickness direction, and the negative electrode film layer is disposed on either or both of the two opposite surfaces of the negative electrode current collector.

In some embodiments, the negative electrode current collector may be a metal foil current collector or a composite current collector. For example, for the metal foil, a copper foil may be used. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the negative electrode active material may be a well-known negative electrode active material used for a battery in the art. For example, the negative electrode active substance may include at least one of the following materials: artificial graphite, natural graphite, soft carbon, hard carbon, a silicon-based material, a tin-based material, lithium titanate, and the like. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, this application is not limited to these materials but may use other conventional materials that can be used as negative electrode active materials for batteries instead. One type of these negative electrode active materials may be used alone, or two or more of them may be used in combination.

In some embodiments, the negative electrode film layer further optionally includes a binder. The binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative-electrode film layer further optionally includes a conductive agent. The conductive agent may be selected from at least one of superconducting carbon, acetylene black, carbon black, Ketjen black, carbon dots, carbon nanotubes, graphene, and carbon nanofiber.

In some embodiments, the negative electrode film layer may further optionally include other promoters such as a thickener (for example, sodium carboxymethyl cellulose (CMC-Na)).

In some embodiments, the negative electrode plate may be prepared in the following manner: the constituents used for preparing the negative electrode plate, for example, the negative electrode active material, the conductive agent, the binder, and any other constituent, are dispersed in a solvent (for example, deionized water) to form a negative electrode slurry; and the negative electrode slurry is applied onto the negative electrode current collector, followed by processes such as drying and cold pressing to obtain the negative electrode plate.

[Electrolyte]

The electrolyte conducts ions between the positive electrode plate and the negative electrode plate. The electrolyte is not specifically limited to any particular type in this application and may be selected based on needs. For example, the electrolyte may be in a liquid state, a gel state, or an all-solid state.

In some embodiments, the electrolyte is a liquid electrolyte. The liquid electrolyte includes an electrolytic salt and a solvent.

In some embodiments, the electrolyte salt may be selected from one or more of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorooxalate phosphate and lithium tetrafluorooxalate phosphate, sodium hexafluorophosphate ($NaPF_6$), sodium hexafluoroborate ($NaBF_4$), $NaN(SO_2F)_2$ (abbreviated as NaFSI), $NaClO_4$, $NaAsF_6$, $NaB(C_2O_4)_2$ (abbreviated as NaBOB), $NaBF_2(C_2O_4)$ (abbreviated as NaDFOB), $NaN(SO_2RF)_2$, and $NaN(SO_2F)(SO_2RF)$; where RF represents $C_bF_{2b+1}$, with b being an integer in the range of 1 to 10, optionally an integer in the range of 1 to 3, and more optionally, $R_F$ being $-CF_3$, $-C_2F_5$, or $-CF_2CF_2CF_3$.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methanesulfonate, and diethyl sulfone.

In some embodiments, the liquid electrolyte further optionally includes an additive. For example, the additive may include a negative electrode film-forming additive and a positive electrode film-forming additive or may include an additive that can improve some performance of a battery, for example, an additive for improving over-charge performance of a battery cell, an additive for improving high-temperature performance or low-temperature performance of a battery, and the like.

In some embodiments, the positive electrode plate, the negative electrode plate, and the separator may be made into an electrode assembly through winding or lamination.

[Outer Package]

In some embodiments, the secondary battery may include an outer package for packaging the positive electrode plate, the negative electrode plate, and an electrolyte. In an example, the positive electrode plate, the negative electrode plate, and the separator may be stacked or wound to form a battery cell of a stacked structure or a battery cell of a wound structure, and the battery cell is packaged in an outer package. The electrolyte may be the liquid electrolyte, and the liquid electrolyte infiltrates into the battery cell. There may be one or more battery cells in the secondary battery, and the quantity can be adjusted based on needs.

In an embodiment, this application provides an electrode assembly. In some embodiments, the positive electrode plate, the negative electrode plate, and the separator may be made into an electrode assembly through winding or lamination. The outer package may be used for packaging the foregoing electrode assembly and electrolyte.

In some embodiments, the outer package of the secondary battery may be a soft pack, for example, a soft pouch. A material of the soft pack may be plastic, for example, may include one or more of polypropylene (PP), polybutylene terephthalate (PBT), polybutylene succinate (PBS), and the like. In some embodiments, the outer package of the secondary battery may be a hard shell, for example, a hard plastic shell, an aluminum shell, or a steel shell.

This application does not impose any special limitations on a shape of the secondary battery, and the secondary battery may be cylindrical, rectangular, or of any other shapes. For example, FIG. 1 shows a secondary battery 5 of a rectangular structure as an example.

Figure 2:
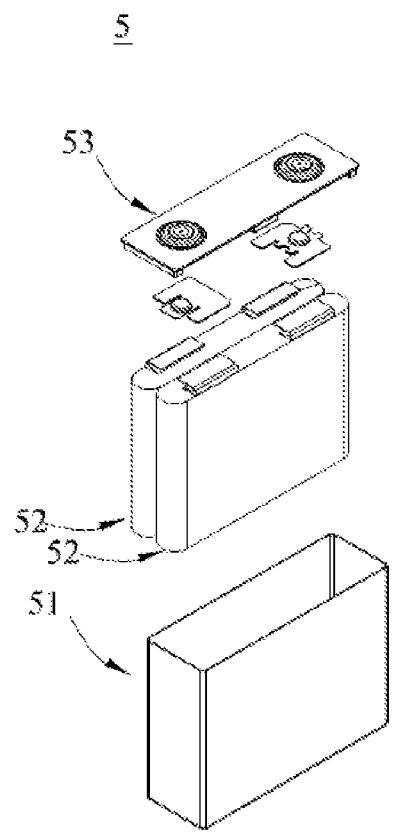
FIG. 2 is an exploded view of the secondary battery according to the embodiment of this application in FIG. 1.

In some embodiments, referring to FIG. 2, the outer package may include a housing 51 and a cover plate 53. The housing 51 may include a base plate and a side plate connected onto the base plate, and the base plate and the side plate enclose an accommodating cavity. The housing 51 has an opening communicating with the accommodating cavity, and the cover plate 53 can cover the opening to close the accommodating cavity. The positive electrode plate, the negative electrode plate, and the separator may be made into an electrode assembly 52 through winding or lamination. The electrode assembly 52 is packaged in the accommodating cavity. The electrolyte infiltrates the electrode assembly 52. There may be one or more electrode assemblies 52 in the secondary battery 5, and persons skilled in the art may make choices according to actual requirements.

In some embodiments, the secondary battery may be assembled into a battery module, and the battery module may include one or more secondary batteries. The specific quantity may be chosen by persons skilled in the art according to the use and capacity of the battery module.

Figure 3:
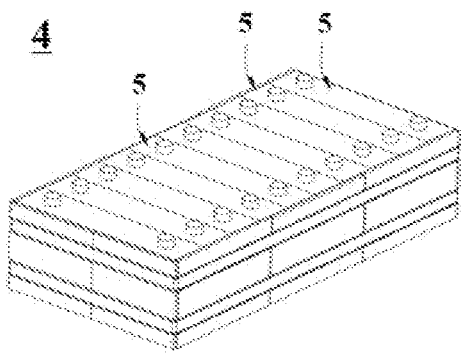
FIG. 3 is a schematic diagram of a battery module according to an embodiment of this application.

FIG. 3 shows a battery module 4 as an example. Refer to FIG. 3. In the battery module 4, a plurality of secondary batteries 5 may be sequentially arranged along a length direction of the battery module 4. Certainly, the batteries may alternatively be arranged in any other manner. Further, the plurality of secondary batteries 5 may be fastened through fasteners.

Optionally, the battery module 4 may further include a housing with accommodating space, and the plurality of secondary batteries 5 are accommodated in the accommodating space.

In some embodiments, the battery module may be further assembled into a battery pack, and the battery pack may include one or more battery modules. The specific quantity may be chosen by persons skilled in the art according to the use and capacity of the battery pack.

Figure 4:
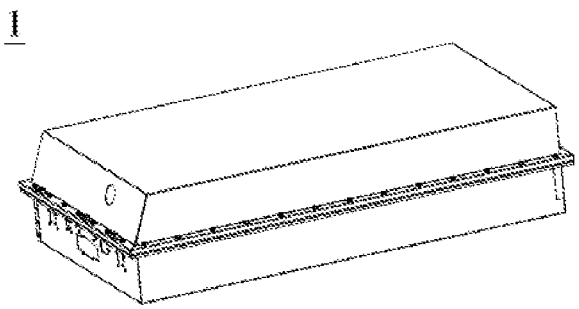
FIG. 4 is a schematic diagram of a battery pack according to an embodiment of this application.
Figure 5:
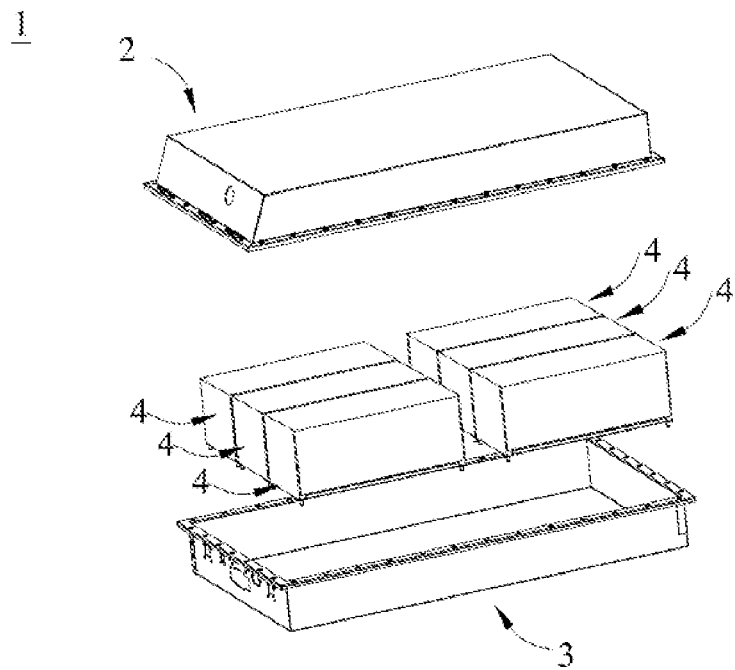
FIG. 5 is an exploded view of the battery pack according to the embodiment of this application in FIG. 4.

FIG. 4 and FIG. 5 show a battery pack 1 as an example. Refer to FIG. 4 and FIG. 5. The battery pack 1 may include a battery box and multiple battery modules 4 arranged in the battery box. The battery box includes an upper box body 2 and a lower box body 3. The upper box body 2 can cover the lower box body 3 to form an enclosed space for accommodating the battery module 4. The plurality of battery modules 4 may be arranged in the battery box in any manner.

In addition, this application further provides an electric apparatus. The electric apparatus includes at least one of the secondary battery, the battery module, or the battery pack provided in this application. The secondary battery, the battery module, or the battery pack may be used as a power source for the electric apparatus or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, or the like, but is not limited thereto.

The secondary battery, the battery module, or the battery pack may be selected for the electric apparatus based on requirements for using the electric apparatus.

Figure 6:
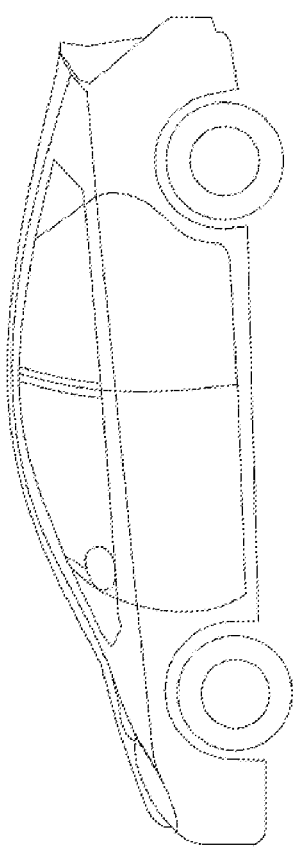
FIG. 6 is a schematic diagram of an electric apparatus using a secondary battery as a power source according to an embodiment of this application.

FIG. 6 shows an electric apparatus as an example. This electric apparatus is a battery electric vehicle, a hybrid electric vehicle, a plug-in hybrid electric vehicle, or the like. To satisfy a requirement of the electric apparatus for high power and high energy density of the secondary battery, a battery pack or a battery module may be used.

In another example, the apparatus may be a mobile phone, a tablet computer, a notebook computer, or the like. Such apparatus usually is required to be light and thin and may use a secondary battery as a power source.

EXAMPLES

The following describes examples of this application. The examples described below are illustrative and only used for explaining this application, and cannot be construed as limitations on this application. Examples whose technical solutions or conditions are not specified are made in accordance with technical solutions or conditions described in literature in the field or made in accordance with product instructions. The reagents or instruments used are all conventional products that are commercially available if no manufacturer is indicated.

EXAMPLES

1. Preparation of the Polymer

Preparation Example 1

At room temperature, 60.92 g of methyl acrylate, 33.04 g of acrylonitrile, and 6.04 g of acrylamide were weighed according to a molar ratio of 50:44:6. They were then added to a 500 mL four-neck flask with a mechanical stirrer, a thermometer, and a condenser tube. Then, 3 g of sodium dodecyl sulfate emulsifier, 1 g of ammonium persulfate initiator, and 120 g of deionized water were added, and the mixture was stirred for 30 min at 1600 rpm to achieve emulsification. Subsequently, the temperature was raised to 75° C. under nitrogen protection, and the reaction proceeded for 4 h. The pH value was adjusted to a range of 6 to 8. After that, the reaction mixture was immediately cooled to below 40° C. and discharged, resulting in the formation of polymer 1.

Preparation Examples 2 to 5

The preparation steps of preparation examples 2 to 5 are the same as those of preparation example 1, except that molar ratios of the three types of monomers were 51:43:6, 52:42:6, 53:41:6, and 54:40:6, respectively, and a total mass of the three types of monomers was 100 g, and polymers 2 to 5 was prepared, respectively.

Preparation Examples 6 to 10

In preparation example 6, at room temperature, 69.71 g of n-butyl acrylate, 24.90 g of acrylonitrile, and 5.39 g of N-hydroxymethylacrylamide were weighed according to a molar ratio of 51:44:5. The remaining steps were the same as those in preparation example 1. Polymer 6 was prepared.

In preparation examples 7 to 10, molar ratios of the foregoing three types of monomers were 52:43:5, 53:42:5, 54:41:5, 55:40:5, respectively, and a total mass of the three types of monomers was 100 g. The remaining steps were the same as those in preparation example 1. Polymers 7 to 10 were prepared, respectively.

Preparation Examples 11 to 15

In preparation example 11, at room temperature, 68.42 g of ethyl methacrylate, 26.91 g of acrylonitrile, and 4.66 g of N-hydroxymethylacrylamide were weighed according to a molar ratio of 52:44:4. The remaining steps were the same as those in preparation example 1, and polymer 11 was prepared.

In preparation examples 12 to 15, molar ratios of the foregoing three types of monomers were 53:43:4, 54:42:4, 55:41:4, 56:40:4, respectively, and a total mass of the three types of monomers was 100 g. The remaining steps were the same as those in preparation example 1, and polymers 12 to 15 were prepared, respectively.

Preparation Examples 16 to 20

In preparation example 16, at room temperature, 67.94 g of 2-hydroxyethyl methacrylate, 29.08 g of methacrylonitrile, and 2.99 g of N-butoxymethacrylamide were weighed according to a molar ratio of 53:44:3. The remaining steps were the same as those in preparation example 1, and polymer 16 was prepared.

In preparation examples 17 to 20, molar ratios of the foregoing three types of monomers were 54:43:3, 55:42:3, 56:41:3, 57:40:3, respectively, and a total mass of the three types of monomers was 100 g. The remaining preparation steps were the same as those in preparation example 1, and polymers 17 to 20 were prepared, respectively.

Preparation Examples 21 to 25

In preparation example 21, at room temperature, 70.44 g of 2-hydroxypropyl methacrylate, 26.71 g of methacrylonitrile, and 2.85 g of N-butoxymethacrylamide were weighed according to a molar ratio of 54:44:2. The remaining preparation steps were the same as those in preparation example 1, and polymer 21 was prepared.

In preparation examples 22 to 25, molar ratios of the foregoing three types of monomers were 55:43:2, 56:42:2, 57:41:2, and 58:40:2, respectively, and a total mass of the three types of monomers was 100 g. The remaining preparation steps were the same as those in preparation example 1, and polymers 22 to 25 were prepared, respectively.

Preparation Example 26

In preparation example 26, at room temperature, 75.13 g of cyclohexyl acrylate, 20.88 g of acrylonitrile, and 4.00 g of acrylamide were weighed according to a molar ratio of 52:42:6. The remaining preparation steps were the same as those in preparation example 1, and polymer 26 was prepared.

Preparation Example 27

In preparation example 27, at room temperature, 80.07 g of isobornyl methacrylate, 16.95 g of methacrylonitrile, and 2.98 g of N-butoxymethacrylamide were weighed according to a molar ratio of 57:40:3. The remaining preparation steps were the same as those in preparation example 1, and polymer 27 was prepared.

Comparative Preparation Example 1

At room temperature, 69.50 g of methyl acrylate, 22.85 g of acrylonitrile, and 7.65 g of acrylamide were weighed according to a molar ratio of 60:32:8. The remaining steps were the same as those in preparation example 1, and polymer C1 was prepared.

Comparative Preparation Example 2

At room temperature, 74.42 g of 2-hydroxyethyl methacrylate and 25.58 g of methacrylonitrile were weighed according to a molar ratio of 60:40. The remaining steps were the same as those in preparation example 1, and polymer C2 was prepared.

The weight-average molecular weights of polymers 1 to 26 and the comparative polymer 1 obtained from the foregoing preparative examples and comparative preparation examples were measured by gel permeation chromatography.

Table 1 shows the monomers and their molar ratios in the foregoing preparation examples 1 to 25 and comparative preparation examples 1 to 2, as well as the weight-average molecular weights of final polymers obtained.

TABLE 1

| No. | First-type monomer | Second-type monomer | Third-type monomer | Molar mass ratio | Weight-average molecular weight |
|---|---|---|---|---|---|
| Preparation example 1 | Methyl acrylate | Acrylonitrile | Acrylamide | 50:44:6 | 63,300 |
| Preparation example 2 | Methyl acrylate | Acrylonitrile | Acrylamide | 51:43:6 | 64,100 |
| Preparation example 3 | Methyl acrylate | Acrylonitrile | Acrylamide | 52:42:6 | 74500 |
| Preparation example 4 | Methyl acrylate | Acrylonitrile | Acrylamide | 53:41:6 | 79,300 |
| Preparation example 5 | Methyl acrylate | Acrylonitrile | Acrylamide | 54:40:6 | 87,100 |
| Preparation example 6 | n-Butyl acrylate | Acrylonitrile | N-methylolacrylamide | 51:44:5 | 76,200 |
| Preparation example 7 | n-butyl acrylate | Acrylonitrile | N-methylolacrylamide | 52:43:5 | 80200 |
| Preparation example 8 | n-butyl acrylate | Acrylonitrile | N-methylolacrylamide | 53:42:5 | 87,800 |
| Preparation example 9 | n-butyl acrylate | Acrylonitrile | N-methylolacrylamide | 54:41:5 | 90,100 |
| Preparation example 10 | n-butyl acrylate | Acrylonitrile | N-methylolacrylamide | 55:40:5 | 91,600 |
| Preparation example 11 | Ethyl methacrylate | Acrylonitrile | N-methylolacrylamide | 52:44:4 | 90,500 |
| Preparation example 12 | Ethyl methacrylate | Acrylonitrile | N-methylolacrylamide | 53:43:4 | 101,200 |
| Preparation example 13 | Ethyl methacrylate | Acrylonitrile | N-methylolacrylamide | 54:42:4 | 102,900 |
| Preparation example 14 | Ethyl methacrylate | Acrylonitrile | N-methylolacrylamide | 55:41:4 | 110,500 |
| Preparation example 15 | Ethyl methacrylate | Acrylonitrile | N-methylolacrylamide | 56:40:4 | 115,000 |
| Preparation example 16 | 2-hydroxyethyl methacrylate | Methacrylonitrile | N-butoxymethacrylamide | 53:44:3 | 90,600 |
| Preparation example 17 | 2-hydroxyethyl methacrylate | Methacrylonitrile | N-butoxymethacrylamide | 54:43:3 | 100,500 |

TABLE 1-continued

| No. | First-type monomer | Second-type monomer | Third-type monomer | Molar mass ratio | Weight-average molecular weight |
|---|---|---|---|---|---|
| Preparation example 18 | 2-hydroxyethyl methacrylate | Methacrylonitrile | N-butoxymethacrylamide | 55:42:3 | 103,900 |
| Preparation example 19 | 2-hydroxyethyl methacrylate | Methacrylonitrile | N-butoxymethacrylamide | 56:41:3 | 110,300 |
| Preparation example 20 | 2-hydroxyethyl methacrylate | Methacrylonitrile | N-butoxymethacrylamide | 57:40:3 | 115,000 |
| Preparation example 21 | 2-hydroxypropyl methacrylate | Methacrylonitrile | N-butoxymethacrylamide | 54:44:2 | 85,600 |
| Preparation example 22 | 2-hydroxypropyl methacrylate | Methacrylonitrile | N-butoxymethacrylamide | 55:43:2 | 93,700 |
| Preparation example 23 | 2-hydroxypropyl methacrylate | Methacrylonitrile | N-butoxymethacrylamide | 56:42:2 | 100,300 |
| Preparation example 24 | 2-hydroxypropyl methacrylate | Methacrylonitrile | N-butoxymethacrylamide | 57:41:2 | 110,300 |
| Preparation example 25 | 2-hydroxypropyl methacrylate | Methacrylonitrile | N-butoxymethacrylamide | 58:40:2 | 118,800 |
| Preparation example 26 | Cyclohexyl acrylate | Acrylonitrile | Acrylamide | 52:42:6 | 84,300 |
| Preparation example 27 | Isobornyl methacrylate | Methacrylonitrile | N-butoxymethacrylamide | 57:40:3 | 116,500 |
| Comparative preparation example 1 | Methyl acrylate | Acrylonitrile | Acrylamide | 60:32:8 | 125,500 |
| Comparative preparation example 2 | 2-hydroxyethyl methacrylate | Methacrylonitrile | N-butoxymethacrylamide | 60:40:0 | 58,400 |

2. Preparation of Silicon Dioxide Particles Modified with Silane Coupling Agent

A mixture was prepared by mixing water, ethanol, and a silane coupling agent in a mass ratio of 8:72:20. Then, the silicon dioxide particles were added into a stirrer and heated to 60° C. to 70° C., and the foregoing mixture was slowly added dropwise to finally achieve a desired mass ratio of the silicon dioxide particles to the mixture as shown in table 2 below. After the dropwise addition was completed, the mixture was further stirred for 2 to 3 h. The mixture was then dried at 120° C. for 2 h to obtain the silicon dioxide particles modified with silane coupling agent.

The median particle size 1300 of the silicon dioxide particles modified with silane coupling agent was measured using a laser particle size analyzer with deionized water as the dispersant, as shown in Table 2 below.

3. Preparation and Performance Testing of Binder

Example 1

1. Preparation of Binder

According to a mass ratio of 75:25 between polymer and silicon dioxide particles modified with silane coupling agent, 250 g of silicon dioxide particles modified with silane coupling agent and 1 kg of deionized water were added to 750 g of polymer 1 obtained in preparation example 1. The mixture was stirred for 1 hour at room temperature, and then subjected to spray drying to such that the polymer was applied to the modified silicon dioxide particles, followed by ball-milling to obtain the binder. The silane coupling agent used was vinyltriethoxysilane, and a median particle size $D_v50$ of the prepared silicon dioxide particles modified with silane coupling agent is 460 nm.

2. Preparation of Separator

Commercially available PP-PE copolymer microporous film (from Advanced Electronic Technology Co., model 20) with a thickness of 20 μm and a median pore size of 80 nm was used as a substrate. The foregoing prepared binder was mixed with N-methylpyrrolidone (NMP) to obtain a slurry (with a solid content of 20%). The slurry was evenly applied on both surfaces of the substrate and then dried to remove the organic solvent. Subsequently, the binder was applied to the substrate with a coating density of 0.5 g/m² to obtain the separator.

3. Preparation of Positive Electrode Plate

Polyvinylidene fluoride (PVDF), lithium iron phosphate (LFP), conductive agent carbon black, and N-methylpyrrolidone (NMP) were mixed in a mass ratio of 1.2:58.38:0.42:40. After thorough stirring and mixing, the uniform positive electrode slurry was prepared. This positive electrode slurry was evenly applied to a positive electrode collector aluminum foil with a loading amount of 200 g/m², followed by drying, cold pressing, and splitting, to obtain the positive electrode plate.

4. Preparation of Negative Electrode Plate

Artificial graphite, conductive agent acetylene black, binder styrene-butadiene rubber (SBR), and thickener sodium carboxymethyl cellulose (CMC-Na) are added into deionized water according to a mass ratio of 96.2:1.0:1.6:1.2, and after thorough stirring and mixing, the uniform negative electrode slurry (with a solid content of 63%) was prepared. This negative electrode slurry was applied to a negative electrode collector copper foil with a loading amount of 98 g/m 2, followed by drying, cold pressing, and splitting, to obtain the negative electrode plate.

5. Preparation of Electrolyte

At 25° C., ethylene carbonate (EC), ethyl methyl carbonate (EMC), and diethyl carbonate (DEC) were mixed according to a volume ratio of 1:1:1 to obtain a mixed solvent. Then, $LiPF_6$ was dissolved in the foregoing mixed solvent to obtain the electrolyte, where the concentration of $LiPF_6$ was 1 mol/L.

(6) Preparation of Secondary Battery

The foregoing positive electrode plate, separator, and negative electrode plate were stacked in order and wound, followed by pre-pressing molding (in this process, adhesion occurs between the separator and the electrode plates) to obtain the electrode assembly. The electrode assembly was put into an outer package, the electrolyte prepared above was injected, and steps such as sealing, standing, formation, and aging were performed to obtain the secondary battery.

Example 2

As shown in table 2 below, according to a mass ratio of 60:40 of the polymer to the silicon dioxide modified with silane coupling agent, 400 g of silicon dioxide particles modified with silane coupling agent and 1 kg of deionized water were added to 600 g of the polymer in example 11. The mixture was stirred for 1 hour at room temperature, and then subjected to spray drying and ball milling to obtain the binder. The remaining steps of example 2 were the same as those in example 1.

Examples 3 to 5

As shown in table 2 below, except that the polymers in examples 3 to 5 were polymers 24, 26, and 27 obtained in preparation examples 24, 26, and 27, respectively, the remaining steps were the same as those in example 1.

Examples 6 to 8

As shown in table 2 below, the silane coupling agents in examples 6 to 8 were 3-aminopropyltri ethoxy silane, 3-(2,3-glycidoxy)propyltrimethoxysilane, and 3-(methacryloyloxy)propyltrimethoxysilane, respectively, and the remaining steps were the same as those in example 1.

Examples 9 to 13

As shown in Table 2 below, mass ratios of the silicon dioxide particles to the silane coupling agent vinyltriethoxysilane in examples 9 to 13 were 99.9:0.1, 99.4:0.6, 98.2:1.8, 98.0:2.0, 97.6:2.4, respectively, and median particle sizes $D_v50$ of the silicon dioxide particles modified with silane coupling agent were 780 nm, 550 nm, 330 nm, 590 nm, 980 nm, respectively, and the remaining steps were the same as those in example 2.

Examples 14 to 17

As shown in table 2 below, mass ratios of the polymer to the silicon dioxide modified with the silane coupling agent in examples 14 to 17 were respectively 40:60, 50:50, 80:20, and 90:10, respectively, and the remaining steps were the same as those in example 3.

Comparative Example 1

As shown in table 2, the difference between comparative example 1 and example 2 lies in that the binder does not include the silane coupling agent, while the remaining steps are the same as those in example 2.

Comparative Examples 2 to 3

As shown in table 2, the difference between comparative examples 2 to 3 and example 1 lies in that the polymers are respectively polymers C1 and C2 obtained in comparative preparation examples 1 and 2, while the remaining steps are the same as those in example 1.

2. Test Method (1) Test of Adhesion Force Between the Separator and the Positive Electrode Plate The battery positive electrode plate and the separator were overlapped together and placed on a hot pressing machine, and the parameters of the hot pressing machine were set as follows: temperature of 25° C., pressure of 10 t, and time of 30s, followed by pressing to prepare a bonded separator/positive electrode plate sample; and the separator/electrode plate sample was cut into a rectangular sample strip of 150×20 mm. A positive electrode plate side of the rectangular strip was attached to the steel plate via a double-sided adhesive, and the separator was detached from the positive side by 2 cm in the length direction at one end of the rectangular strip so as to obtain a test sample.

The steel plate was kept horizontal and fastened via a lower clamp of a universal testing machine (Xie Qiang Instrument Manufacturing (Shanghai) Co., Ltd., model CTM2100), and a peeling end of the separator was fastened via an upper clamp of the foregoing universal testing machine and was connected to a tensile machine. Test conditions were set to a stretching rate of 20 mm/min and a horizontal pull of 10 cm. When a tensile force was stabilized, the tensile force was recorded, and an adhesion force between the separator and the electrode plate was obtained based on a ratio of the tensile force to a width of the sample. The test results are shown in table 2.

(2) Battery Cycling Performance/Capacity Retention Rate Test

Taking example 1 as an example, the battery capacity retention rate testing procedure is as follows: at 25° C., the battery prepared in example 1 was charged to 4.3 V at a constant current of ⅓C, then charged to 0.05 C at a constant voltage of 4.3 V, left standing for 5 min, and then discharged to 2.8 V at ⅓C, and a resulting discharge capacity was recorded as an initial capacity Co. The foregoing steps were repeated for the same battery and a discharge capacity $C_0$ of the battery after the n-th cycle was recorded. A battery capacity retention rate after each cycle was $P_n=(C_n/C_0)\times 100\%$. That is, the battery capacity retention rate at a specific number of cycles can be used to reflect the difference in the cycling performance.

The battery capacity retention data corresponding to example 1 in table 2 was measured after 100 cycles under the foregoing test conditions. The test procedure in the comparative examples and other examples were the same as above. The test results are shown in table 2.

TABLE 2

| No | Polymer | Silane coupling agent | Mass ratio of the silicon dioxide to the silane coupling agent | Median particle size/nm | Mass ratio of the polymer to the modified silicon dioxide | Adhesion between a separator to an electrode plate/N/m | Capacity retention rate/% |
|---|---|---|---|---|---|---|---|
| Example 1 | 1 | Vinyltriethoxysilane | 98.8:1.2 | 460 | 75:25 | 5.40 | 96.0 |
| Example 2 | 11 | Vinyltriethoxysilane | 98.8:1.2 | 460 | 60:40 | 6.20 | 97.0 |
| Example 3 | 24 | Vinyltriethoxysilane | 98.8:1.2 | 460 | 75:25 | 5.50 | 97.0 |
| Example 4 | 26 | Vinyltriethoxysilane | 98.8:1.2 | 460 | 75:25 | 5.10 | 96.0 |
| Example 5 | 27 | Vinyltriethoxysilane | 98.8:1.2 | 460 | 75:25 | 4.80 | 96.0 |
| Example 6 | 1 | 3-aminopropyltriethoxysilane | 98.8:1.2 | 460 | 75:25 | 5.70 | 96.0 |
| Example 7 | 1 | 3-(2,3-glycidoxy)propyltrimethoxysilane | 98.8:1.2 | 460 | 75:25 | 4.90 | 97.0 |
| Example 8 | 1 | 3-(methacryloyloxy)propyltrimethoxysilane | 98.8:1.2 | 460 | 75:25 | 5.30 | 96.0 |
| Example 9 | 11 | Vinyltriethoxysilane | 99.9:0.1 | 780 | 60:40 | 2.50 | 93.0 |
| Example 10 | 11 | Vinyltriethoxysilane | 99.4:0.6 | 550 | 60:40 | 4.60 | 96.0 |
| Example 11 | 11 | Vinyltriethoxysilane | 98.2:1.8 | 330 | 60:40 | 4.80 | 98.0 |
| Example 12 | 11 | Vinyltriethoxysilane | 98.0:2.0 | 590 | 60:40 | 4.40 | 95.0 |
| Example 13 | 11 | Vinyltriethoxysilane | 97.6:2.4 | 980 | 60:40 | 3.80 | 94.0 |
| Example 14 | 24 | Vinyltriethoxysilane | 98.8:1.2 | 460 | 40:60 | 2.50 | 95.0 |
| Example 15 | 24 | Vinyltriethoxysilane | 98.8:1.2 | 460 | 50:50 | 3.90 | 97.0 |
| Example 16 | 24 | Vinyltriethoxysilane | 98.8:1.2 | 460 | 80:20 | 5.10 | 98.0 |
| Example 17 | 24 | Vinyltriethoxysilane | 98.8:1.2 | 460 | 90:10 | 3.40 | 94.0 |
| Comparative Example 1 | 11 | — | — | 810 | 60:40 | 2.30 | 86.0 |
| Comparative Example 2 | C1 | Vinyltriethoxysilane | 98.8:1.2 | 460 | 75:25 | 2.00 | 91.0 |
| Comparative Example 3 | C2 | Vinyltriethoxysilane | 98.8:1.2 | 460 | 75:25 | 1.90 | 90.0 |

\* The particle size here in comparative example 1 is the particle size of the ceramic particles not modified with coupling agent.

It can be seen from the comparison between examples 1 to 17 and comparative examples 1 to 3 in table 2 that the binder in this application has good adhesion performance and helps to improve battery capacity retention rate of the secondary battery.

It should be noted that this application is not limited to the foregoing embodiments. The foregoing embodiments are merely examples, and embodiments having substantially the same constructions and the same effects as the technical idea within the scope of the technical solutions of this application are all included in the technical scope of this application. In addition, without departing from the essence of this application, various modifications made to the embodiments that can be conceived by persons skilled in the art, and other manners constructed by combining some of the constituent elements in the embodiments are also included in the scope of this application.

What is claimed is:

1. A binder comprising:
   a polymer containing structural units derived from a first-type monomer, a second-type monomer, and a third-type monomer, a molar ratio of the first-type monomer, the second-type monomer, and the third-type monomer being (50 to 58):(40 to 44):(2 to 6); and
   ceramic particles modified with silane coupling agent;
   wherein:
   the first-type monomer is selected from one or more compounds of formula I:

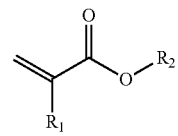

I wherein, R$_1$ is selected from a hydrogen atom and a straight-chain or branched-chain C$_{1-6}$ alkyl group, and R$_2$ is selected from a substituted er straight-chain C$_{4-15}$ alkyl group, a substituted branched-chain C$_{4-15}$ alkyl group, a substituted C$_{3-6}$ cycloalkyl group, and a substituted isobornyl group, a substituent group for the substituted straight-chain C$_{4-15}$ alkyl group or the substituted branched-chain C$_{4-15}$ alkyl group is a hydroxyl group, and a substituent group for the substituted C$_{3-6}$ cycloalkyl group or the substituted isobornyl group is selected from a hydroxyl group and a C$_{1-6}$ chain alkyl group;
   the second-type monomer is selected from one or more compounds of formula II:

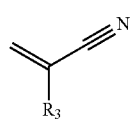

II wherein, R₃ is selected from a hydrogen atom and a straight-chain or branched-chain $C_{1-6}$ alkyl group; and the third-type monomer is selected from one or more compounds of formula III:

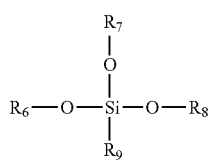

wherein, R₄ is selected from a hydrogen atom and a straight-chain or branched-chain $C_{1-6}$ alkyl group, and R₅ is selected from a hydrogen atom, a hydroxy $C_{1-6}$ alkyl group, and a $C_{1-6}$ alkoxy group.

2. The binder according to claim 1, wherein:
R₁ is selected from a straight-chain or branched-chain $C_{2-6}$ alkyl group; and/or
R₃ is selected from a straight-chain or branched-chain C2-6 alkyl group; and/or
R₄ is selected from a straight-chain or branched-chain C1-6 alkyl group; and/or
R₅ is selected from a hydroxy $C_{2-6}$ alkyl group, and a $C_{1-4}$ alkoxy group.

3. The binder according to claim 1, wherein a molar ratio of the first-type monomer, the second-type monomer, and the third-type monomer is (50 to 57):(41 to 44):(2 to 6).

4. The binder according to claim 1, wherein the polymer has a weight-average molecular weight of 60,000 to 120,000.

5. The binder according to claim 1, wherein the ceramic particles modified with silane coupling agent has a median particle size $D_v50$ of 200 nm to 980 nm.

6. The binder according to claim 1, wherein the silane coupling agent is selected from one or more compounds of formula IV:

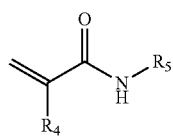

wherein, R₆, R₇, and R₈ are independently selected from a straight-chain or branched-chain $C_{1-6}$ alkyl group; R₉ is selected from a $C_{2-6}$ alkenyl group and a $C_{1-6}$ straight alkyl group, wherein at least one hydrogen atom on a carbon atom on an end of the $C_{1-6}$ straight alkyl group is substituted with a substituent group selected from amino, 2,3-epoxypropyloxy, and methacryloyloxy.

7. The binder according to claim 1, wherein a weight ratio of the ceramic particles and the silane coupling agent is (97.5 to 99.9):(0.1 to 2.5).

8. The binder according to claim 1, wherein a weight ratio of the polymer and the ceramic particles is (40 to 90):(10 to 60).

9. The binder according to claim 1, wherein the polymer is applied to the ceramic particles.

10. A separator, comprising:
a base layer; and
a coating provided on at least one surface of the base layer, wherein the coating comprises the binder according to claim 1.

11. The binder according to claim 1, wherein:
R₁ is selected from a straight-chain or branched-chain $C_{2-6}$ alkyl group.

12. The binder according to claim 1, wherein:
R₃ is selected from a straight-chain or branched-chain $C_{2-6}$ alkyl group.

13. The binder according to claim 1, wherein:
R₄ is selected from a straight-chain or branched-chain $C_{1-6}$ alkyl group.

14. A binder comprising:
a polymer containing structural units derived from a first-type monomer, a second-type monomer, and a third-type monomer, a molar ratio of the first-type monomer, the second-type monomer, and the third-type monomer being (50 to 58):(40 to 44):(2 to 6); and
ceramic particles modified with silane coupling agent;
wherein:
the first-type monomer is selected from one or more compounds of formula I:

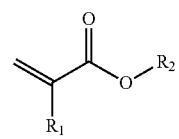

wherein, R₁ is selected from a hydrogen atom and a straight-chain or branched-chain $C_{1-6}$ alkyl group, and R₂ is selected from a substituted or unsubstituted straight-chain or branched-chain $C_{1-15}$ alkyl group, a $C_{3-6}$ cycloalkyl group, and an isobornyl group, wherein in a case of substitution, a substituent group is selected from a hydroxyl group and a $C_{1-6}$ chain alkyl group;

the second-type monomer is selected from one or more compounds of formula II:

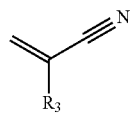

wherein, R₃ is selected from a hydrogen atom and a straight-chain or branched-chain $C_{1-6}$ alkyl group; and the third-type monomer is selected from one or more compounds of formula III:

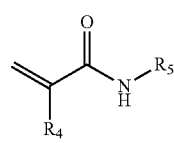

wherein, R₄ is selected from a hydrogen atom and a straight-chain or branched-chain $C_{1-6}$ alkyl group, and $R^5$ is selected from a hydroxy $C_{2-6}$ alkyl group and a $C_{1-6}$ alkoxy group.

15. A binder comprising:

a polymer containing structural units derived from a first-type monomer, a second-type monomer, and a third-type monomer, a molar ratio of the first-type monomer, the second-type monomer, and the third-type monomer being (50 to 58):(40 to 44):(2 to 6); and ceramic particles modified with silane coupling agent;

wherein:

the first-type monomer is selected from one or more compounds of formula I:

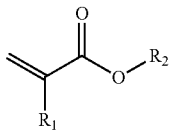

I wherein, $R_1$ is selected from a hydrogen atom and a straight-chain or branched-chain $C_{1-6}$ alkyl group, and $R_2$ is selected from a substituted or unsubstituted straight-chain or branched-chain $C_{1-15}$ alkyl group, a $C_{3-6}$ cycloalkyl group, and an isobornyl group, wherein in a case of substitution, a substituent group is selected from a hydroxyl group and a $C_{1-6}$ chain alkyl group;

the second-type monomer is selected from one or more compounds of formula II:

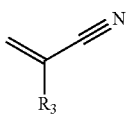

II wherein, $R_3$ is selected from a hydrogen atom and a straight-chain or branched-chain $C_{1-6}$ alkyl group;

the third-type monomer is selected from one or more compounds of formula III:

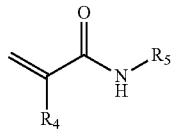

III wherein, $R_4$ is selected from a hydrogen atom and a straight-chain or branched-chain $C_{1-6}$ alkyl group, and $R_5$ is selected from a hydrogen atom, a hydroxy $C_{1-6}$ alkyl group, and a $C_{1-6}$ alkoxy group; and the silane coupling agent is selected from one or more compounds of formula IV:

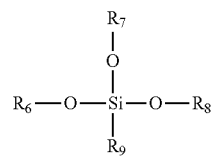

IV wherein, $R_6$, $R_7$, and $R_8$ are independently selected from a straight-chain or branched-chain $C_{1-6}$ alkyl group, $R_9$ is selected from a $C_{1-6}$ straight alkyl group, and at least one hydrogen atom on a carbon atom on an end of the $C_{1-6}$ straight alkyl group is substituted with 2,3-epoxypropyloxy.

16. The binder according to claim 15, wherein:

R9 is selected from 3-aminopropyl and 3-(2,3-epoxypropoxy) propyl.

17. A secondary battery comprising the binder according to claim 1.

18. A battery module, comprising the secondary battery according to claim 17.

19. A battery pack, comprising the battery module according to claim 18.

20. An electric apparatus, comprising the secondary battery according to claim 17.

* * * * *